(12) United States Patent
Jäger

(10) Patent No.: US 9,788,489 B2
(45) Date of Patent: Oct. 17, 2017

(54) SUGARCANE HARVESTING MACHINE

(71) Applicant: EA BROEKEMA BV, Veendam (NL)

(72) Inventor: Sebastian Jäger, Hannover (DE)

(73) Assignee: EA BROEKEMA BV, Veendam (NL)

( * ) Notice: Subject to any disclaimer, the term of this patent is extended or adjusted under 35 U.S.C. 154(b) by 845 days.

(21) Appl. No.: 14/139,208

(22) Filed: Dec. 23, 2013

(65) Prior Publication Data

US 2015/0173298 A1    Jun. 25, 2015

(51) Int. Cl.
  *A01D 43/00*  (2006.01)
  *A01D 57/20*  (2006.01)
  *A01D 45/10*  (2006.01)

(52) U.S. Cl.
  CPC ............ *A01D 57/20* (2013.01); *A01D 45/10* (2013.01)

(58) Field of Classification Search
  CPC ........ A01D 45/10; A01D 57/06; A01D 57/20; A01D 87/02; A01D 2017/108; A01D 2017/103; B65G 17/063
  See application file for complete search history.

(56) References Cited

U.S. PATENT DOCUMENTS

| | | | | |
|---|---|---|---|---|
| 1,666,818 A | * | 4/1928 | Fisher | A01D 45/10 56/15.3 |
| 1,899,766 A | * | 2/1933 | McWilliams | B65G 17/02 198/699 |
| 2,071,325 A | * | 2/1937 | Troiley | A01D 17/10 171/105 |
| 2,743,829 A | * | 5/1956 | Ballad | B65G 19/20 15/84 |
| 2,906,395 A | | 9/1959 | Greer | 198/850 |
| 2,953,886 A | * | 9/1960 | Douglas | A01D 45/10 56/13.9 |
| 3,015,381 A | * | 1/1962 | Mohwinkel | A01D 17/10 198/834 |

(Continued)

FOREIGN PATENT DOCUMENTS

| | | |
|---|---|---|
| DE | 0861071 | 12/1952 |
| DE | 1199039 | 8/1965 |

(Continued)

*Primary Examiner* — Thomas B Will
*Assistant Examiner* — Joan D Misa
(74) *Attorney, Agent, or Firm* — Shlesinger, Arkwright & Garvey LLP

(57) ABSTRACT

Sugarcane harvesting machine has an inclined conveyor which conveys sugarcane sections from the harvesting machine into a collection car and has at least two traction mechanisms which extend parallel to one another and have continuous carriers, and which circulate over upper drive wheels, and lower deflection wheels carried along and situated in the feed area of the sugarcane sections. Thus, inclined conveyor has a long, low maintenance service life and sugarcane harvesting machine operates quietly and energy-efficiently with a high cleaning effect. The continuous traction mechanisms are belts of fabric layer-reinforced crosslinked polymer, and cams situated at a distance from one another are situated on bottom side of the belts for forcible drive by the drive wheels. Belts are connected by transverse rods which as a whole form a screening floor and support floor, and deflection wheels which are carried along are configured as single wheels.

8 Claims, 4 Drawing Sheets

(56) References Cited

U.S. PATENT DOCUMENTS

| | | | | |
|---|---|---|---|---|
| 3,141,281 | A * | 7/1964 | Gaunt | A01D 45/10 56/14.5 |
| 3,253,699 | A | 5/1966 | Schneider | A01D 17/10 198/494 |
| 3,315,788 | A | 4/1967 | Anderson | A01D 17/10 198/690.2 |
| 3,339,712 | A | 9/1967 | Anderson | A01D 17/10 198/834 |
| 3,369,306 | A * | 2/1968 | Evans | B65G 17/063 198/626.1 |
| 3,460,324 | A * | 8/1969 | Tolar | A01D 45/10 56/10.7 |
| 3,555,790 | A | 1/1971 | Quick | |
| 3,589,502 | A | 6/1971 | Maillet | |
| 3,618,747 | A | 11/1971 | Hammond | A01D 17/10 198/848 |
| 3,734,269 | A * | 5/1973 | Ross | A01D 33/08 198/698 |
| 3,830,046 | A | 8/1974 | Rollitt | |
| 3,976,192 | A | 8/1976 | Muller | 198/835 |
| 3,985,224 | A | 10/1976 | Harvey | 198/851 |
| 4,023,671 | A * | 5/1977 | Kramer | F16G 3/08 198/699 |
| 4,070,809 | A * | 1/1978 | Soulat | A01D 45/10 56/13.9 |
| 4,121,778 | A * | 10/1978 | Quick | A01D 45/10 209/139.1 |
| 4,653,632 | A * | 3/1987 | Timmer | A01D 17/10 198/822 |
| 4,697,693 | A * | 10/1987 | Rajala | B65G 15/42 198/698 |
| 4,712,668 | A | 12/1987 | Gray | |
| 4,724,909 | A * | 2/1988 | Link | A01D 17/10 171/126 |
| 4,965,993 | A | 10/1990 | Butler | A01D 31/00 198/510.1 |
| 5,099,548 | A | 3/1992 | Loosli | 24/38 |
| 5,168,981 | A * | 12/1992 | Ruff | A01D 17/10 198/728 |
| 5,176,248 | A | 1/1993 | Allen et al. | 198/850 |
| 5,671,839 | A | 9/1997 | Sanderson | 198/848 |
| 5,692,598 | A | 12/1997 | Rohrs | |
| 5,738,223 | A | 4/1998 | Rohrs | 209/307 |
| 6,106,391 | A * | 8/2000 | Tjabringa | A01D 17/10 198/848 |
| 6,272,819 | B1 * | 8/2001 | Wendte | A01D 41/127 460/6 |
| 6,442,920 | B1 * | 9/2002 | Peterson | A01D 46/26 56/328.1 |
| 6,896,125 | B2 | 5/2005 | Webster et al. | 198/844.2 |
| 7,131,532 | B2 * | 11/2006 | Webster | B65G 15/52 198/803.2 |
| 7,182,202 | B2 * | 2/2007 | Kalverkamp | B65G 17/02 198/698 |
| 7,308,786 | B2 | 12/2007 | Mulder | 56/16.4 R |
| 7,681,388 | B1 * | 3/2010 | Hinds | A01D 41/1217 56/126 |
| 7,850,562 | B2 * | 12/2010 | DeGroot | B65G 15/26 198/411 |
| 8,596,447 | B2 * | 12/2013 | Gentz | A01D 61/008 198/731 |
| 9,033,138 | B2 * | 5/2015 | Mulder | A01D 17/10 198/848 |
| 9,033,139 | B2 | 5/2015 | Jäger | |
| 2004/0250523 | A1 | 12/2004 | Schulz | |
| 2005/0109000 | A1 | 5/2005 | Mulder | |
| 2008/0202405 | A1 | 8/2008 | Kern | |
| 2010/0269470 | A1 * | 10/2010 | Price | A01D 45/10 56/10.2 H |
| 2012/0043263 | A1 | 2/2012 | Kalverkamp | |
| 2012/0186949 | A1 | 7/2012 | Gentz | |
| 2014/0367230 | A1 * | 12/2014 | Jager | B65G 15/48 198/850 |
| 2015/0141098 | A1 | 5/2015 | Mulder | |
| 2015/0173298 | A1 | 6/2015 | Jäger | |

FOREIGN PATENT DOCUMENTS

| | | | |
|---|---|---|---|
| DE | 2715108 | 12/1978 | |
| DE | 3318735 A1 * | 11/1984 | A01D 17/10 |
| DE | 34 41 605 A1 | 5/1986 | |
| DE | 3737066 | 8/1989 | |
| DE | 3733712 C2 | 7/1992 | B65G 15/52 |
| DE | 41 32 246 A1 | 4/1993 | |
| DE | 4311054 | 10/1994 | |
| DE | 195 20 925 A1 | 12/1996 | |
| DE | 195 20 927 A1 | 12/1996 | |
| DE | 297 03 270 U1 | 5/1997 | |
| DE | 200 11 436 U1 | 11/2000 | |
| DE | 10308823 | 9/2004 | |
| DE | 102004023705 B3 | 6/2005 | |
| DE | 10 2005 027 841 A1 | 1/2007 | |
| DE | 102005027841 A1 | 1/2007 | |
| DE | 202007015687 | 2/2008 | |
| DE | 10 2007 049 839 | 6/2009 | |
| DE | 10 2009 036104 B4 | 2/2012 | |
| DE | 10 2010 035043 | 2/2012 | |
| EP | 00830238 | 6/1983 | |
| EP | 1733607 B1 | 7/2008 | |
| FR | 2628080 A1 * | 9/1989 | A01D 17/10 |
| WO | 9523497 | 8/1995 | |

* cited by examiner

SUGARCANE HARVESTING MACHINE

FIELD OF THE INVENTION

The present invention relates to a sugarcane harvesting machine. More particularly, the invention relates to a sugarcane harvesting machine having an inclined conveyor which conveys sugarcane sections from the harvesting machine into a collection car.

BACKGROUND OF THE INVENTION

A sugarcane harvesting machine of this type is known from U.S. Pat. No. 3,830,046. An inclined conveyor is situated at the end of the product flow through this machine, and conveys sugarcane sections, formed by comminuting the cut sugarcane stalks in the machine, into a collection car. The inclined conveyor has two continuous traction mechanisms, designed as chains, which extend in parallel to one another and are connected by steel carriers. The chains run over upper drive wheels, and lower deflection wheels which are carried along and situated in the feed area of the sugarcane sections. The inclined conveyor is designed as a scraper conveyor; i.e., it has a robust sheet steel floor which forms a running surface over the entire length of the inclined conveyor and scrapes the carriers, thus upwardly conveying the sugarcane sections resting on the sheet steel floor.

A first and a second extractor which are used to remove waste and the like from the sugarcane sections are situated in the sugarcane harvesting machine. The extractors operate via a rotor which generates an air flow which carries along the waste and conveys it to the outside. A first extractor is situated in a transition zone of the sugarcane sections on the inclined conveyor, while the second extractor is situated at the end of the inclined conveyor and removes waste from the sugarcane sections when they drop down at the upper end of the inclined conveyor and fall into the collection car.

Such inclined conveyors described above with reference to the prior art have many drawbacks. The steel chains wear out very quickly due to adhering sand and dust. In addition, they fall out of the division after even a few hours of operation due to the acting tension, causing the teeth to come out of the drive wheels. For this reason, the conveyor requires continuous monitoring and maintenance, and in spite of this has a short service life. A high level of wear and high energy consumption occur during operation of the inclined conveyor, since the sugarcane sections are scraped during conveyance over the steel floor of the conveyor. This is also associated with a high noise level due to the metal-to-metal contact. Furthermore, the scraper floor of the conveyor, which is made of solid sheet steel, is very heavy. A further drawback is that, due to the scraper floor which acts as a barrier, the inclined conveyor, although it is perforated, conveys almost all of the impurities along with it, resulting in only a very low screening and cleaning effect and thus subjecting the second extractor to heavy load.

OBJECTS AND SUMMARY OF THE INVENTION

An object of the invention is to overcome the drawbacks of the prior art.

Another object of the invention is to provide a sugarcane harvesting machine of the kind having an inclined conveyor, the inclined conveyor of which has a long service life with low maintenance, and which at the same time operates quietly and in an energy-efficient manner with a high cleaning effect.

This object is achieved according to the invention by a sugarcane harvesting machine including:
  a) an inclined conveyor;
  b) the inclined conveyor conveys sugarcane sections from the harvesting machine into a collection car and the inclined conveyor has at least two traction mechanisms which extend in parallel to one another and have continuous carriers, which circulate over upper drive wheels and lower deflection wheels which are carried along and situated in the feed area of the sugarcane sections;
  c) the at least two traction mechanisms are continuous traction mechanisms configured as belts made of fabric layer-reinforced crosslinked polymer; and
  d) cams are situated at a distance from one another and are situated on a bottom side of the belts for forcible drive by the drive wheels, the belts being connected to one another by a plurality of transverse rods which as a whole form a screening floor and support floor, and the deflection wheels which are carried along being configured as single wheels.

Sugarcane harvesting machine according to the invention includes an inclined conveyor which conveys sugarcane sections from the harvesting machine into a collection car and has at least two traction mechanisms which extend in parallel to one another and have continuous carriers, and which circulate over upper drive wheels, and lower deflection wheels which are carried along and situated in the feed area of the sugarcane sections. The continuous traction mechanisms are configured as belts made of fabric layer-reinforced crosslinked polymer, and cams situated at a distance from one another are situated on the bottom side of the belts for forcible drive by the drive wheels, the belts being connected to one another by a plurality of transverse rods which as a whole form a screening floor and support floor, and the deflection wheels which are carried along being configured as single wheels.

According to the invention, the traction mechanisms of the inclined conveyor are polymer-fabric belts which are forcibly driven via cams. As a result, polymer material runs on metal when the inclined conveyor is driven, so that on the one hand the conveyor runs very quietly, and on the other hand minimal wear occurs, resulting in a long service life. Retightening of the polymer-fabric belts is not necessary. In addition, energy is conserved, since the sugarcane sections are carried on the transverse rods which connect the belts, and are no longer scraped. At the same time, this results in a higher conveying capacity.

As a whole, the inclined conveyor may have a configuration which is much more open at the sides and at the bottom, resulting in a high screening and cleaning effect. The scraper floor is dispensed with, so that the inclined conveyor in conjunction with the transverse rods connecting the traction belts is open at the bottom, which is made possible only by engineering the deflection wheels of the belts as single wheels, i.e., not connected to one another by a shaft, thus avoiding winding of plant material around such a shaft. Opening of the inclined conveyor at the sides is possible due to the fact that the belts, unlike the roller chains known from the prior art, do not require lateral guide rails, and instead may be guided over support rollers. Due to the high screening and cleaning effect of the inclined conveyor, the second extractor at the top end of the inclined conveyor may be dispensed with.

Further advantageous embodiments of the invention are set forth below.

Relative terms such as left, right, and down are for convenience only and are not intended to be limiting.

The invention is explained in greater detail below with reference to one exemplary embodiment. The associated figures show the following:

DETAILED DESCRIPTION OF THE INVENTION

Figure 1:
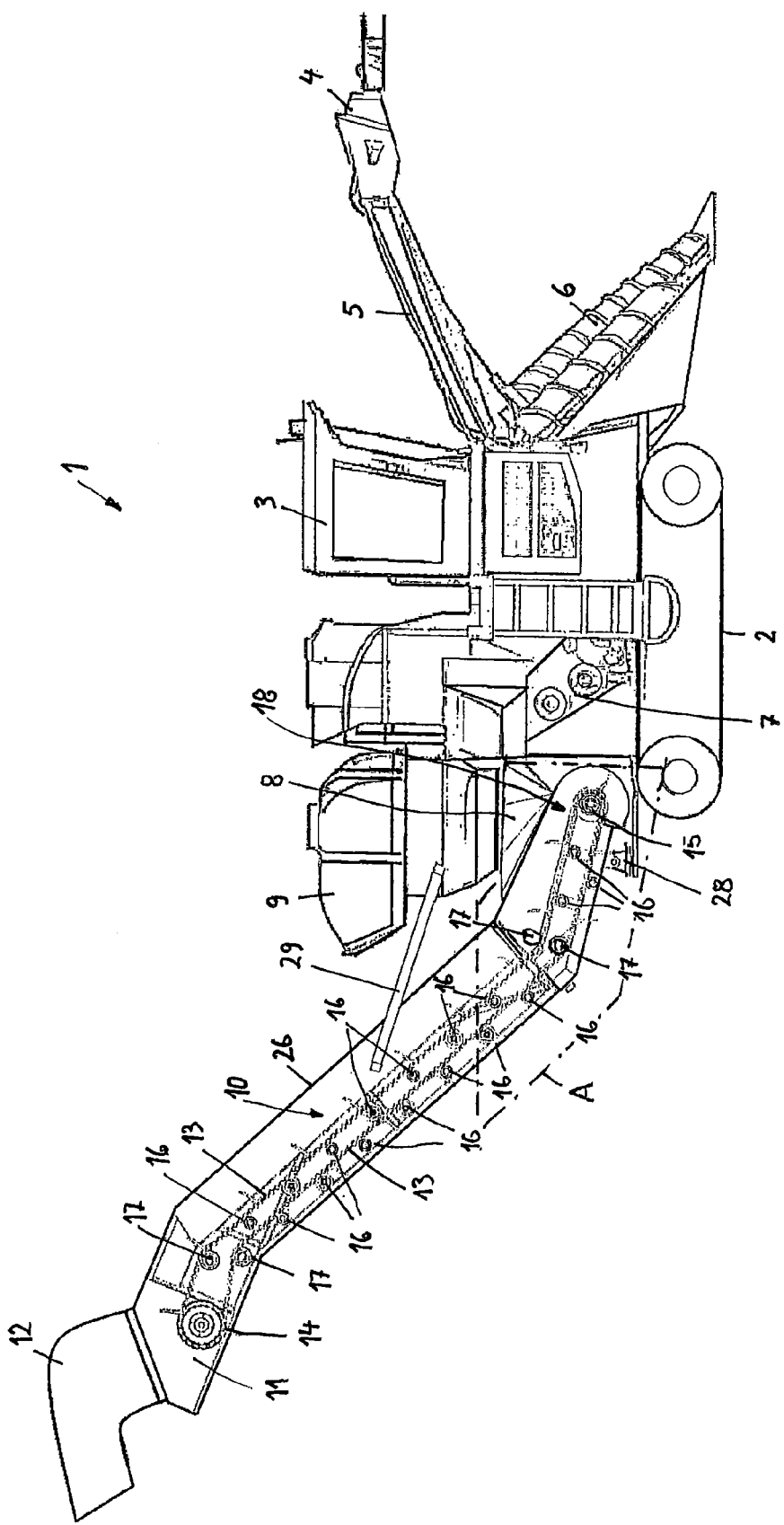
FIG. 1 shows a schematic side view of a sugarcane harvesting machine according to the invention.

FIG. 1 shows a self-propelled sugarcane harvesting machine 1. Crawler chains 2 are provided as the chassis, although rubber tires may likewise be used.

The sugarcane harvesting machine 1 has a driver's cab 3 from which an operator may observe and control the harvesting operation. The harvesting operation begins with topping the sugarcane plants before the stalks pass into the harvesting machine. The topping is carried out by means of an end cutter 4 which is mounted on the sugarcane harvesting machine 1 via a frame 5. The topped stalks are then gripped by two rotary crop dividers 6 arranged in parallel to one another, and led into the machine. In the machine, the stalks are separated from the underground roots by two counter-rotating base cutting disks, not illustrated. The sugarcane stalks are then fed via conveying devices, not illustrated, and cutting rollers, likewise not illustrated. The base cutting disks comminute the sugarcane stalks into sugarcane sections, so-called billets, which subsequently enter a rotary conveyor which is equipped with flinger rollers 7. These rollers 7 cast the sugarcane sections in a curved trajectory into a collection funnel 8. A first extractor 9 having a suction blower is situated above the trajectory of the sugarcane sections. This blower draws impurities, for example leaves, from the freely falling flow of sugarcane sections and exhausts them to the outside. The collection funnel 8 is situated at a feed end 18 of an inclined conveyor 10.

The sugarcane sections pass from the collection funnel 8 to the inclined conveyor 10, which conveys them upwardly to a discharge end 11. At this discharge end 11 the sugarcane sections leave the inclined conveyor 10 and drop in free fall into a co-traveling collection car. A second extractor 12 which draws any impurities from the sugarcane section flow that have been conveyed via the inclined conveyor 10 and exhausts them to the outside is situated above the discharge end 11.

The inclined conveyor 10 has two continuous traction mechanisms, extending in parallel to one another, which are configured as belts 13 made of fabric layer-reinforced cross-linked polymer. The traction mechanisms circulate over drive wheels 14 situated at the discharge end 11 and deflection wheels 15 which are situated at the feed end 18 and carried along. The upper run 33 and the lower run 24 of the inclined conveyor 10 are supported by support rollers 16, and their pitch angle is changed by means of deflection rollers 17.

Figure 4:
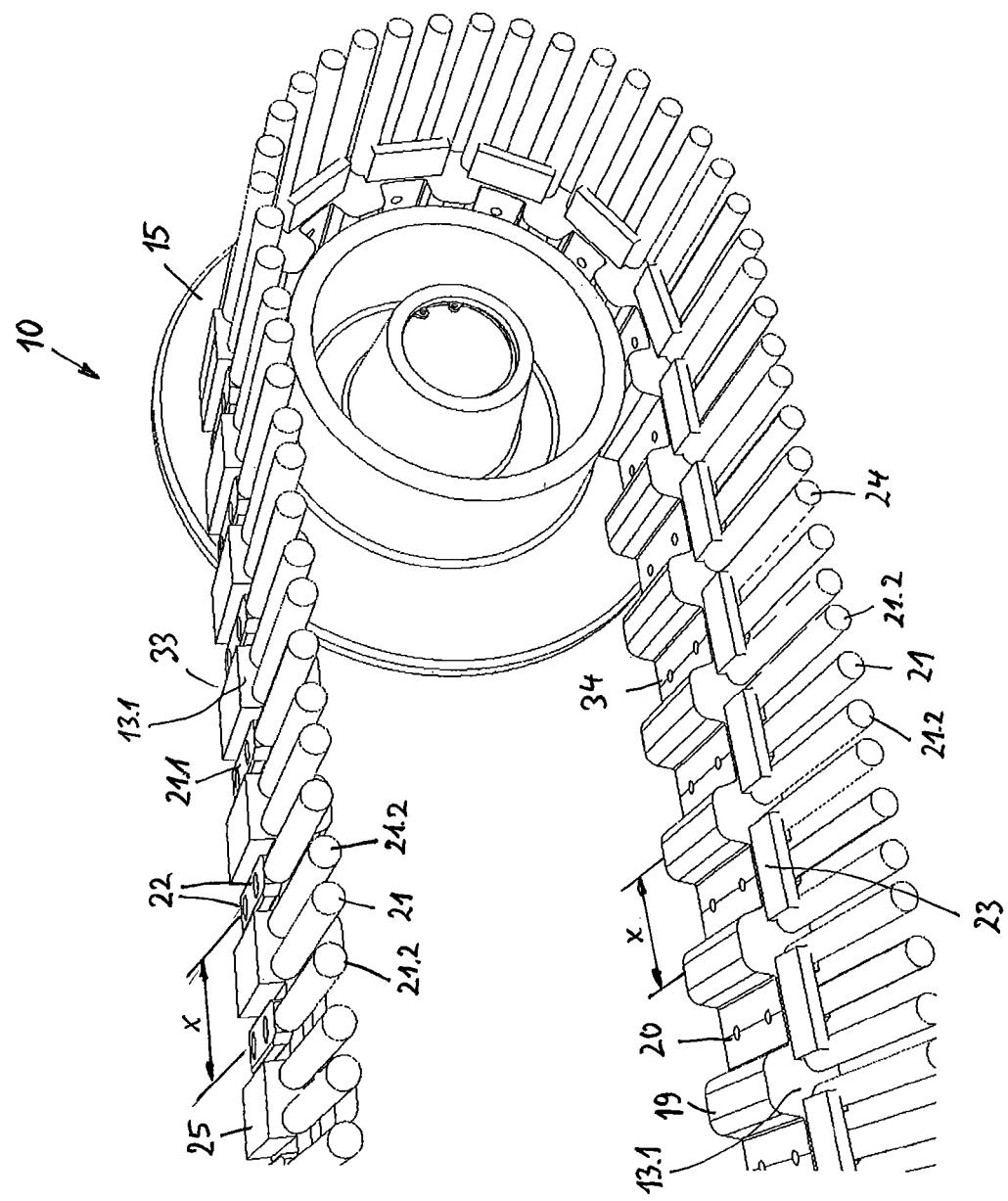
FIG. 4 shows a perspective view of the inner side of a deflection wheel of the inclined conveyor with circulating belts and partly cut-away transverse rods.

FIG. 4 illustrates only one side of the inclined conveyor 10 in a partial detail. The other side has a mirror-image design, so that the following statements apply to that side as well.

Cams 19 which are separated at a division x from one another are provided on the bottom side of the belts 13. These cams 19 are used for forcibly driving the inclined conveyor 10. For this purpose, a drive device (not illustrated) of the drive wheels 14 engages with gaps 20 formed between the cams 19. Designs of this type are known from the prior art, and therefore are not explained in greater detail here.

The distance between the belts 13 is established by rods 21 which are situated transversely with respect to the conveying direction of the inclined conveyor 10 and parallel to one another, and which at their ends are connected to the belts 13. For this purpose, the rods 21 are provided with flattened end regions 21.1 which are produced by forging from round rods and which rest on the belts 13. The end regions 21.1 have two holes, separated at a distance from one another, for fastening elements, for example rivets 22, which pass through the flat end regions 21.1 as well as the belts 13. The rods 21 rest on the belts 13 in the area above the gaps 20; i.e., the rods have the same division x as the cams 19.

Welded to the bottom side of the rods 21 are crossbars 23 in the form of sheet steel strips, to the top side of which in each case are welded two further rods 21.2 situated parallel to the rods 21 and at a distance therefrom. The rods 21.2 have no contact with the belts 13, but instead are guided at their ends right up to the inner side 13.1 of the belts 13 in order to have the largest possible working width. In contrast to the rods 21, the rods 21.2 do not require forging, and may be cut to exact length from a coil, i.e., may be easily produced.

Since the fastening areas 21.1 of the rods 21, viewed in the running direction of the belts 13, have only a narrow extent, further cams 25 may be provided on the top side of the belts 13, diametrically opposite from the cams 19. These cams 25 are used to protect the end regions 21.1 of the rods 21 which are fastened to the belts 13, as well as for noise protection when the belts 13 roll off on the support rollers 16 and the deflection rollers 17.

As the result of a rod 21 being connected in each case to two further rods 21.2, the division of the rods 21.2 and 21 as a whole is significantly smaller than the division x of the cams 19. This ensures on the one hand that sugarcane sections delivered to the feed point 11 on the upper run 33 of the inclined conveyor 10 cannot fall through the gaps between the rods 21 and 21.2, and on the other hand, that very good cleaning power is nevertheless achieved due to the fact that impurities conveyed with the sugarcane sections are able to fall through the gaps between the rods 21 and 21.2.

The inclined conveyor 10 is situated in a support arm 26 which is composed of steel profiles 27 that are welded and screwed together. The lower end of the support arm 26 is pivotably mounted on the chassis of the sugarcane harvesting machine 1 via a pivot bearing 28. For this purpose, the support arm 26 is pivotably connected over approximately one-half of its length to a hydraulic unit 29 on each side, and its other end is pivotably hinged to the sugarcane harvesting machine 1. By activating the hydraulic unit 29, the support arm 26 as a whole may be pivoted, i.e., set at a steeper or flatter angle, about the pivot bearing 28.

Figure 3:
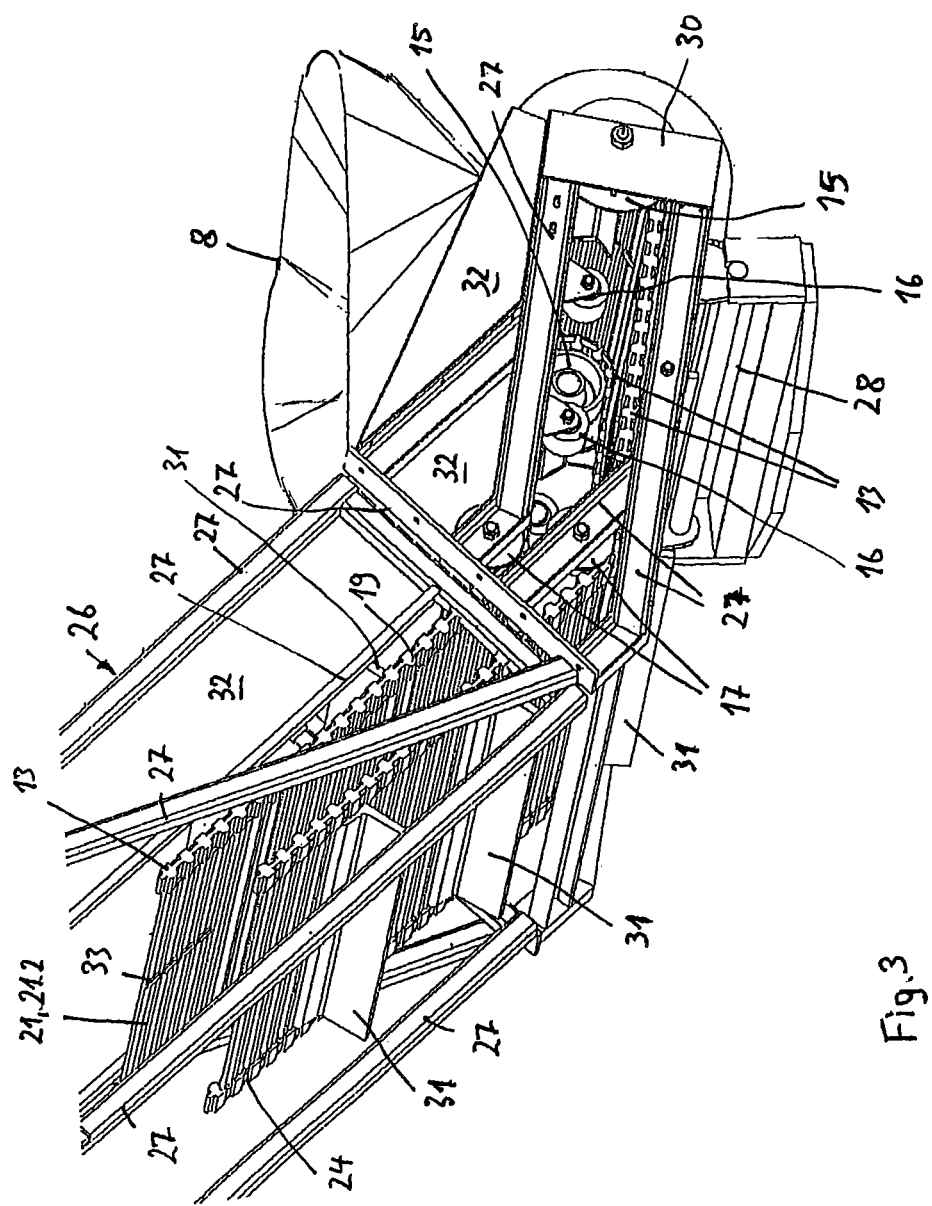
FIG. 3 shows a perspective oblique view, from the top right, of the illustration according to FIG. 2.

The deflection wheels 15 of the inclined conveyor 10 are configured as single wheels, i.e., are not connected to one another by a shaft, as is apparent from FIG. 3. Each of the deflection wheels 15 is individually rotatably mounted on a lateral bearing plate 30 of the support arm 26.

As described above, the inclined conveyor 10 is driven by drive wheels 14 provided at the discharge end 11 of the inclined conveyor 10. The drive device (not illustrated) of the drive wheels 14 engage with the gaps 20 between the cams 19 in a positive-fit manner, thus forcibly driving the belts 13. Due to this forcible drive, the lower run 34 of the inclined conveyor 10 extends downwardly from the drive wheels 14 to the deflection rollers 15. From there, the upper run 33 extends upwardly back to the drive wheels 14. The inclined conveyor 10 is supported on its circulation path by support rollers 16, the upper run 33 rolling off on the support rollers 16 via the cams 19, and the lower run 24 rolling off on the support rollers 16 via the cams 25.

The inclined conveyor 10, viewed over its length, has sections having different pitch angles. In the area of the feed end 18 the inclined conveyor has a first section with a flat pitch angle, and then, deflected on deflection rollers 17, goes into a longer middle section with a steeper ascent. Further deflection rollers 17 which transfer the inclined conveyor 10 into a third section once again having a lower pitch angle are provided at the end of the middle section.

Figure 2:
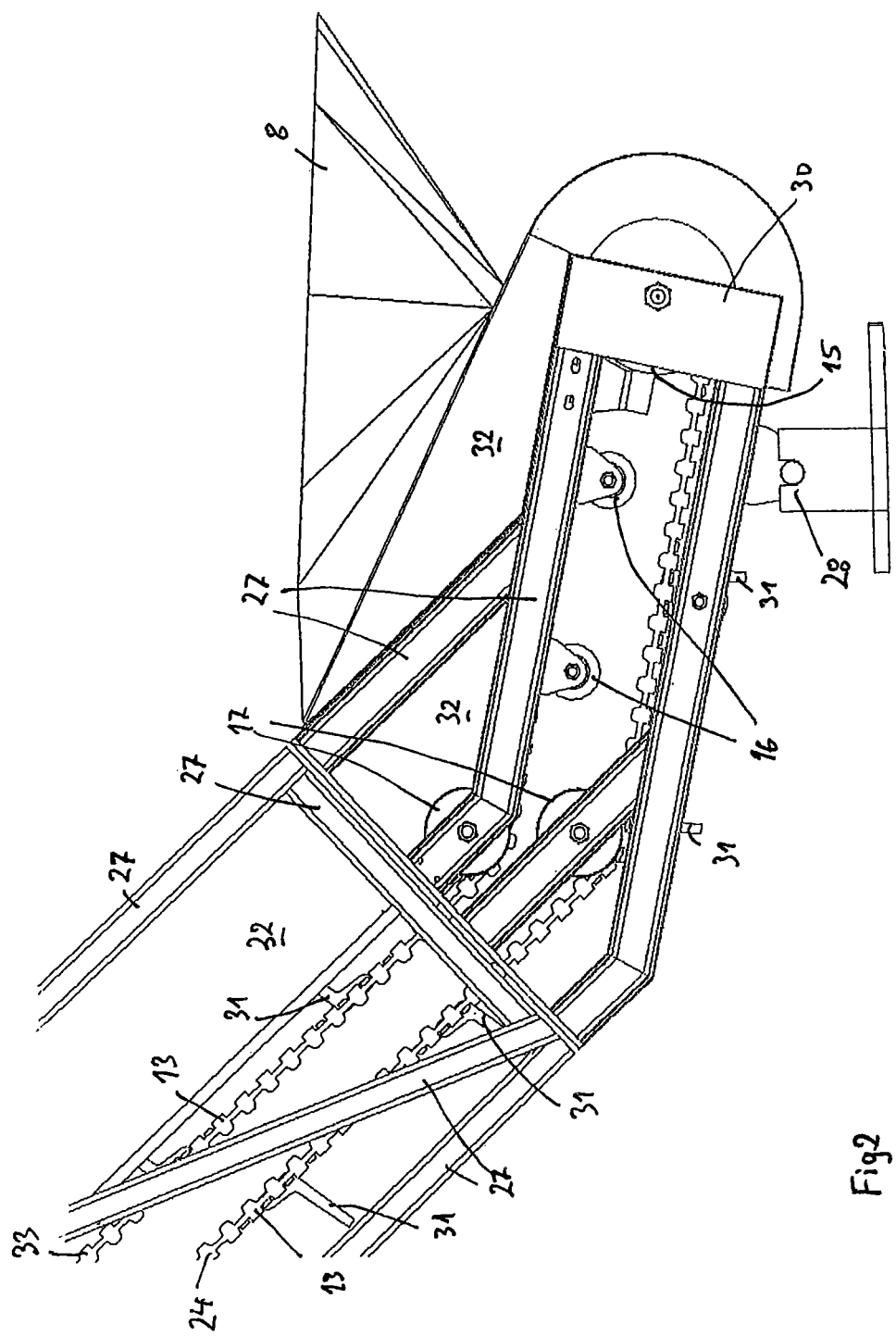
FIG. 2 shows an enlarged detail A according to FIG. 1.

During operation of the sugarcane harvesting machine 1, via the collection funnel 8 the sugarcane sections fall on the rods 21 and 21.2 of the upper run 33 in the area of the feed end 18 of the inclined conveyor 10, which as a whole form a screening and support floor. Impurities such as soil, leaves, etc., which are conveyed with the sugarcane sections and which have not yet been removed by the first extractor 9 may fall down through the gaps between the rods 21 and 21.2, and are thus sifted out in a manner of speaking. It is advantageous that the inclined conveyor 10 is completely open at the side in the area of the feed end 18 between the upper run 33 and the lower run 24, as is apparent from FIG. 2, so that the sifted-out impurities are able not only to fall downwardly, but also to migrate laterally. It is not possible for plant residues to be wound onto the deflection wheels 15, since, as described above, the deflection wheels are not connected by a shaft.

To prevent the sugarcane sections conveyed by the inclined conveyor 10 from being able to roll down onto the rods or transverse rods 21 and rod or further rods 21.2, in particular at the steeper middle section of the inclined conveyor 10, carriers 31 made of an abrasion-resistant polymer and which carry the sugarcane sections along at the top are fastened to the rods 21 and 21.2.

To prevent the sugarcane sections resting on the upper run 33 of the inclined conveyor 10 from falling down on the side, side plates 32 which together with the upper run 33 form a U-shaped conveying channel are provided on both sides of the upper run 33.

The cleaning effect of the inclined conveyor 10 is even further enhanced due to the belts 13 of the inclined conveyor together with its cams 19 running over the support rollers 16, thus generating vibrations which are transmitted from the belts 13 to the rods 21 and 21.2.

At the discharge end 11 of the inclined conveyor 10, the conveyed sugarcane sections drop in free fall into a collection car. Due to the very good cleaning effect of the inclined conveyor 10 as described herein, the second extractor 12 illustrated in FIG. 1 may be dispensed with, or may be connected only as needed.

It will be seen that the invention has been achieved of a sugarcane harvesting machine having an inclined conveyor which conveys sugarcane sections from the harvesting machine into a collection car and has at least two traction mechanisms which extend in parallel to one another and have continuous carriers, and which circulate over upper drive wheels, and lower deflection wheels which are carried along and situated in the feed area of the sugarcane sections. A sugarcane harvesting machine of this type has been configured in such a way according to the invention that its inclined conveyor has a long service life with low maintenance, and at the same time the sugarcane harvesting machine operates quietly and in an energy-efficient manner with a high cleaning effect. As set forth herein this has been achieved, for example, in that the continuous traction mechanisms are configured as belts 13 made of fabric layer-reinforced crosslinked polymer, and cams 19 situated at a distance from one another are situated on the bottom side of the belts for forcible drive by the drive wheels 14. The belts 13 are connected to one another by a plurality of transverse rods 21 which as a whole form a screening floor and support floor, and the deflection wheels 15 which are carried along are configured as single wheels.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. Sugarcane harvesting machine, comprising:
  a) an inclined conveyor;
  b) the inclined conveyor conveys sugarcane sections from the harvesting machine into a collection car and the inclined conveyor has at least two endless traction mechanisms which have carriers and the carriers extend in parallel to one another and which the at least two endless traction mechanisms circulate over upper drive wheels and over lower deflection wheels which are situated in a feed area for the sugarcane sections;
  c) the at least two endless traction mechanisms are configured as belts made of fabric layer-reinforced crosslinked polymer;
  d) cams are situated at a distance from one another and are situated on a bottom side of the belts for forcible drive by the upper drive wheels, the belts being connected to one another by a plurality of transverse rods which as a whole form a screening floor and support floor, and the lower deflection wheels being configured as single wheels without respective shafts to avoid winding of plant material winding around the respective shafts; and
  e) the inclined conveyor has a side, the side being open in the area of its feed end.

2. Sugarcane harvesting machine according to claim 1, wherein:
  a) at least one further rod is fixedly joined to the plurality of transverse rods which is connected to the belt, and the at least one further rod is situated parallel to and at a distance from the plurality of transverse rods, the ends of the at least one further rod being guided right up to the inner side of the belts.

3. Sugarcane harvesting machine according to claim 2, wherein:
  a) a crossbar which is fixedly joined to the at least one further rod is welded to both sides to the plurality of transverse rods which is connected to the belts.

4. Sugarcane harvesting machine according to claim 1, wherein:
   a) the cams of the belts roll off on support rollers, resulting in vibration of the plurality of transverse rods and the at least one further rod.

5. Sugarcane harvesting machine according to claim 1, wherein:
   a) the carriers made of an abrasion-resistant polymer are fastened to the plurality of transverse rods and the at least one further rod.

6. Sugarcane harvesting machine, comprising:
   a) an inclined conveyor;
   b) the inclined conveyor conveys sugarcane sections from the harvesting machine into a collection car and the inclined conveyor has at least two endless traction mechanisms which have carriers and the carriers extend in parallel to one another, and which the at least two endless traction mechanisms circulate over upper drive wheels and over lower deflection wheels which are situated in a feed area for the sugarcane sections;
   c) the at least two endless traction mechanisms are configured as belts made of fabric layer-reinforced crosslinked polymer;
   d) cams are situated at a distance from one another and are situated on a bottom side of the belts for forcible drive by the upper drive wheels, the belts being connected to one another by a plurality of transverse rods which as a whole form a screening floor and support floor, and the lower deflection wheels being configured as single wheels without respective shafts to avoid winding of plant material winding around the respective shafts;
   e) at least one further rod is fixedly joined to the plurality of transverse rods which is connected to the belt, and the at least one further rod is situated parallel to and at a distance from the plurality of transverse rods, the ends of the at least one further rod being guided right up to the inner side of the belts; and
   f) a crossbar which is fixedly joined to the at least one further rod is welded to both sides to the plurality of transverse rods which is connected to the belts.

7. Sugarcane harvesting machine according to claim 6, wherein:
   a) the cams of the belts roll off on support rollers, resulting in vibration of the plurality of transverse rods and the at least one further rod.

8. Sugarcane harvesting machine according to claim 6, wherein:
   a) the carriers made of an abrasion-resistant polymer are fastened to the plurality of transverse rods and the at least one further rod.

* * * * *